(12) United States Patent
Joseph et al.

(10) Patent No.: US 11,032,704 B2
(45) Date of Patent: Jun. 8, 2021

(54) TECHNIQUES FOR SUBSCRIPTION-BASED AUTHENTICATION IN WIRELESS COMMUNICATIONS

(71) Applicant: QUALCOMM Incorporated, San Diego, CA (US)

(72) Inventors: Vinay Joseph, San Diego, CA (US); Anand Palanigounder, San Diego, CA (US); Michele Berionne, San Diego, CA (US); Philip Hawkes, Valley Heights (AU); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/201,813

(22) Filed: Nov. 27, 2018

(65) Prior Publication Data

US 2019/0174314 A1     Jun. 6, 2019

Related U.S. Application Data

(60) Provisional application No. 62/593,635, filed on Dec. 1, 2017.

(51) Int. Cl.
*H04W 12/065* (2021.01)
*H04W 12/40* (2021.01)
(Continued)

(52) U.S. Cl.
CPC .......... *H04W 12/065* (2021.01); *H04W 8/18* (2013.01); *H04W 12/06* (2013.01);
(Continued)

(58) Field of Classification Search
CPC . H04W 12/0605; H04W 12/004; H04W 8/18; H04W 12/06; H04W 12/00403;
(Continued)

(56) References Cited

U.S. PATENT DOCUMENTS

2010/0197350 A1* 8/2010 Jeung .................... H04W 8/183
455/558
2011/0265146 A1* 10/2011 He ...................... H04W 12/069
726/3
(Continued)

FOREIGN PATENT DOCUMENTS

WO        2017023349 A1    2/2017

OTHER PUBLICATIONS

International Search Report and Written Opinion—PCT/US2018/062860—ISA/EPO—dated Feb. 27, 2019.

*Primary Examiner* — Michael Y Mapa
(74) *Attorney, Agent, or Firm* — Arent Fox LLP

(57) ABSTRACT

Aspects of the present disclosure describe authentication of a user equipment (UE) in a network. It can be determined, by the UE, to access a discovered network for wireless communications, and based on a service provider associated with the discovered network, to use a modified universal subscriber identity module (USIM) subscription stored in the UE for authentication with the discovered network. The UE can obtain a subscriber identifier for authenticating on the discovered network via the authentication, where the subscriber identifier is generated based at least in part on a service provider identifier associated with the service provider and a modified mobile subscriber identity associated with the service provider. The UE can send the subscriber identifier to a node of the discovered network for the authentication.

28 Claims, 9 Drawing Sheets

(51) Int. Cl.
*H04W 12/069* (2021.01)
*H04W 8/18* (2009.01)
*H04W 12/06* (2021.01)
*H04W 48/10* (2009.01)
*H04W 48/16* (2009.01)
*H04W 48/18* (2009.01)
*H04W 12/43* (2021.01)

(52) U.S. Cl.
CPC ......... *H04W 12/069* (2021.01); *H04W 12/40* (2021.01); *H04W 12/43* (2021.01); *H04W 48/10* (2013.01); *H04W 48/16* (2013.01); *H04W 48/18* (2013.01)

(58) Field of Classification Search
CPC . H04W 12/0609; H04W 48/10; H04W 48/16; H04W 48/18
USPC ........................................ 455/411, 432.1–444
See application file for complete search history.

(56) References Cited

U.S. PATENT DOCUMENTS

| | | | |
|---|---|---|---|
| 2015/0126184 A1* | 5/2015 | Holtmanns | H04W 8/08 455/432.3 |
| 2016/0100331 A1* | 4/2016 | Ahmavaara | H04W 28/08 370/236 |
| 2016/0227471 A1* | 8/2016 | De Foy | H04L 12/4633 |
| 2017/0034767 A1 | 2/2017 | Griot et al. | |
| 2018/0368209 A1* | 12/2018 | Zhou | H04W 76/10 |

\* cited by examiner

TECHNIQUES FOR SUBSCRIPTION-BASED AUTHENTICATION IN WIRELESS COMMUNICATIONS

CLAIM OF PRIORITY UNDER 35 U.S.C. § 119

The present Application for Patent claims priority to Provisional Application No. 62/593,635, entitled "TECHNIQUES FOR SUBSCRIPTION-BASED AUTHENTICATION IN WIRELESS COMMUNICATIONS" filed Dec. 1, 2017, which is assigned to the assignee hereof and hereby expressly incorporated by reference herein for all purposes.

BACKGROUND

Aspects of the present disclosure relate generally to wireless communication systems, and more particularly, to performing subscription-based authentication in wireless communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

Additionally, various types of supported networks and network operators are being deployed to provide user equipment (UE), which are typically associated with cellular communications via a public land mobile network (PLMN), with access to different types of networks provided by different service providers that may not include mobile network operators (MNO). These different service providers are often referred to as, or include, "neutral hosts." Authentication over such neutral host networks is typically supported using international mobile subscriber identity (IMSI)-based credentials hosted in a universal subscriber identity module (USIM) of the UE, or certificate-based credentials where the UE is required to securely store and manage a certificate for authenticating on the neutral host network.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for authentication used by a user equipment (UE) is provided. The method includes determining, by the UE, to access a discovered network for wireless communications, determining, by the UE and based on a service provider associated with the discovered network, to use a modified universal subscriber identity module (USIM) subscription stored in the UE for authentication with the discovered network, obtaining, by the UE, a subscriber identifier for authenticating on the discovered network via the authentication, where the subscriber identifier is generated based at least in part on a service provider identifier associated with the service provider and a modified mobile subscriber identity associated with the service provider, and sending, by the UE, the subscriber identifier to a node of the discovered network for the authentication.

In another example, a method for authenticating a UE in wireless communications is provided. The method includes broadcasting information including a service provider identifier of a service provider associated with a network, receiving, from the UE, a subscriber identifier for authenticating the UE to access the network, wherein the subscriber identifier is generated based at least in part on the service provider identifier associated with the service provider and a modified mobile subscriber identity associated with the service provider, and authenticating the UE with the network based on the subscriber identifier by communicating with the service provider for authentication.

In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
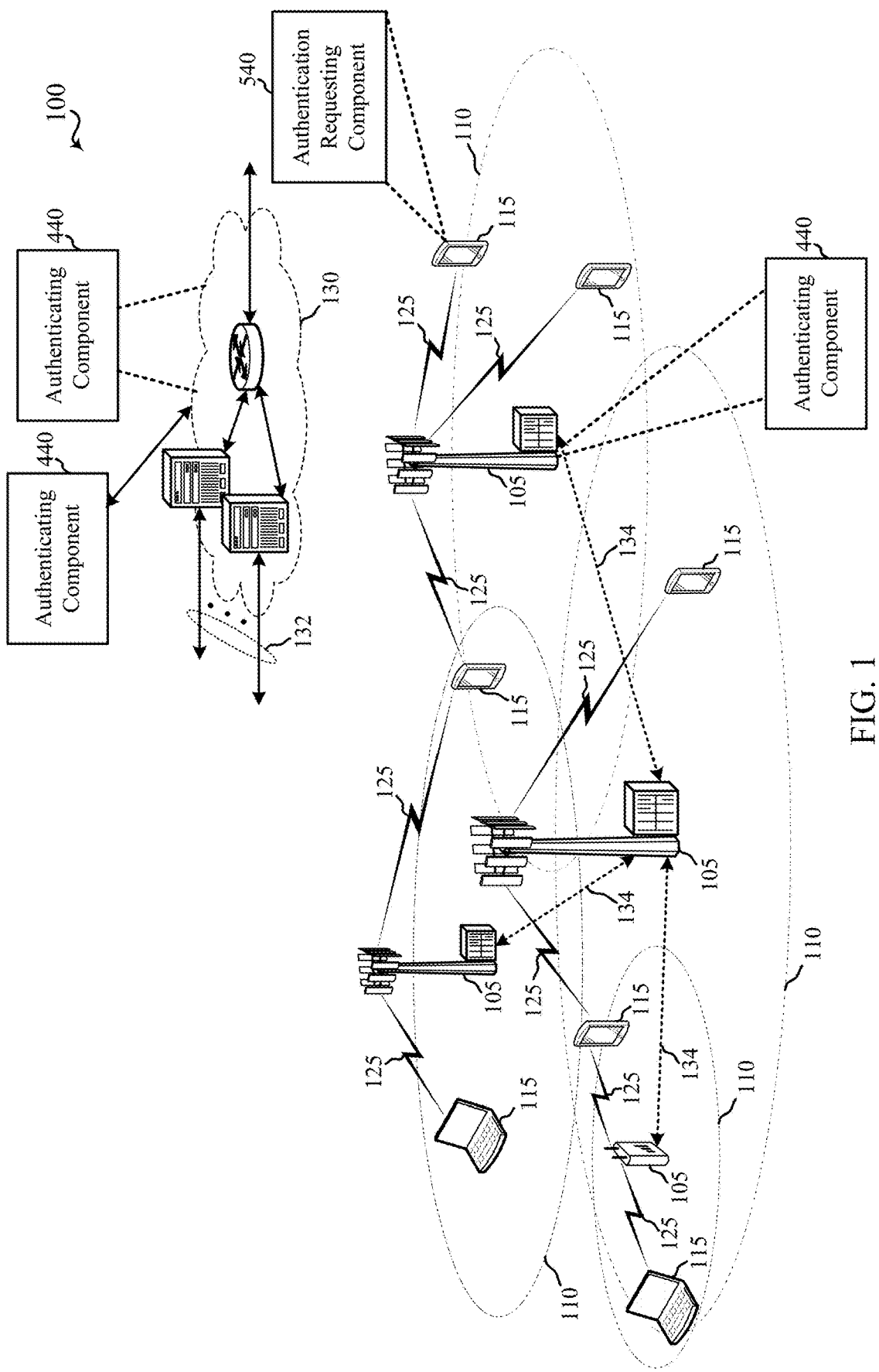
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to authenticating user equipment (UE) on neutral host networks based on a modified authentication mechanism that uses a modified subscriber profile. Neutral host networks can include networks that are not operated by a mobile network operator (MNO) or otherwise do not communicate with or utilize MNO authentication for UEs connecting to the network. For example, MNOs can operators that have an assigned public land mobile network (PLMN) identifier (ID) and/or that can issue subscriber identity modules (SIMs), embedded SIMs (eSIMs), etc. to UEs to facilitate subscription-based access to MNO-provided networks. The neutral host networks, which may not have assigned PLMN-IDs and/or may not issue SIMs/eSIMs, etc., however, may have some similar authentication nodes and use some similar authentication protocols as a MNO. According to aspects described herein, for example, the modified subscriber profile that can be used to authenticate on a neutral host network can correspond to a modified universal subscriber identity module (USIM) subscription that may include one or more (e.g., a list of) service provider identifiers, corresponding mobile subscriber identifiers for using the service (e.g., which may be modified versions of an international mobile subscriber identity (IMSI)), and/or the like.

In one example, a neutral host network can transmit an identifier indicating that the neutral host network supports a modified authentication. The UE can receive this identifier (e.g., in signaling from the neutral host network) and can accordingly determine a subscriber identifier for the neutral host network, which can be based on the service provider identifier and the associated modified mobile subscriber identity. In one example, the subscriber identifier may include the service provider identifier and the associated modified mobile subscriber identity, and/or can be generated from the service provider identifier and the associated modified mobile subscriber identity. This can allow for using granular identifiers (e.g., as opposed to just the IMSI of the UE) for service provider and subscriptions for neutral host networks, while also not requiring secure storage of certificates, management of certificates, etc.

The described features will be presented in more detail below with reference to FIGS. 1-9.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 illustrates an example of a wireless communication system 100 in accordance with various aspects of the present disclosure. The wireless communication system 100 may include one or more base stations 105, one or more UEs 115, and a core network 130. The core network 130 may provide user authentication, access authorization, tracking, internet protocol (IP) connectivity, and other access, routing, or mobility functions. The base stations 105 may interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X2, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a network entity, a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may be or include a Long Term Evolution (LTE) or LTE-Advanced (LTE-A) network. The wireless communication system 100 may also be a next generation network, such as a 5G wireless communication network. In LTE/LTE-A networks, the term evolved node B (eNB), gNB, etc. may be generally used to describe the base stations 105, while the term UE may be generally used to describe the UEs 115. The wireless communication system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs 115 with service subscriptions with the network provider.

A small cell may include a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB, gNB, etc. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A packet data convergence protocol (PDCP) layer can provide header compression, ciphering, integrity protection, etc. of IP packets. A radio link control (RLC) layer may perform packet segmentation and reassembly to communicate over logical channels. A media access control (MAC) layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, or the like. A UE may be able to communicate with various types of base stations and network equipment including macro eNBs, small cell eNBs, relay base stations, and the like.

The communication links 125 shown in wireless communication system 100 may carry UL transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In aspects of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In aspects of the wireless communication system 100, one or more of the base stations 105 may include an authenticating component 440 for authenticating a UE 115 to communicate with core network 130, which may be a mobile network operator (MNO) cellular network, a neutral host network (NHN), and/or the like, as described further herein. In other examples, the core network 130 may include the authenticating component 440, or a portion thereof, and/or may be coupled with the authenticating component 440, which may be provided by another network. For example, authenticating component 440 in the code network 130 may include, or may be at least partially implemented or provided by, an authentication, authorization, and accounting (AAA) server or function, 3GPP AAA, home subscriber server (HSS), or a combination thereof. In another example, authentication may be carried out jointly by one or more authenticating components 440 and nodes in the network, such as base station 105 (which may be an eNB, gNB, etc.), a mobility management entity (MME), neutral host MME (NH-MME), MuLTEFire access point (MF-AP), neutral host gateway (NH-GW), Local AAA Proxy, etc. In additional aspects, UE 115 may include an authentication requesting component 540 for requesting authentication with a core network 130 via one or more base stations 105, as described further herein.

Figure 2:
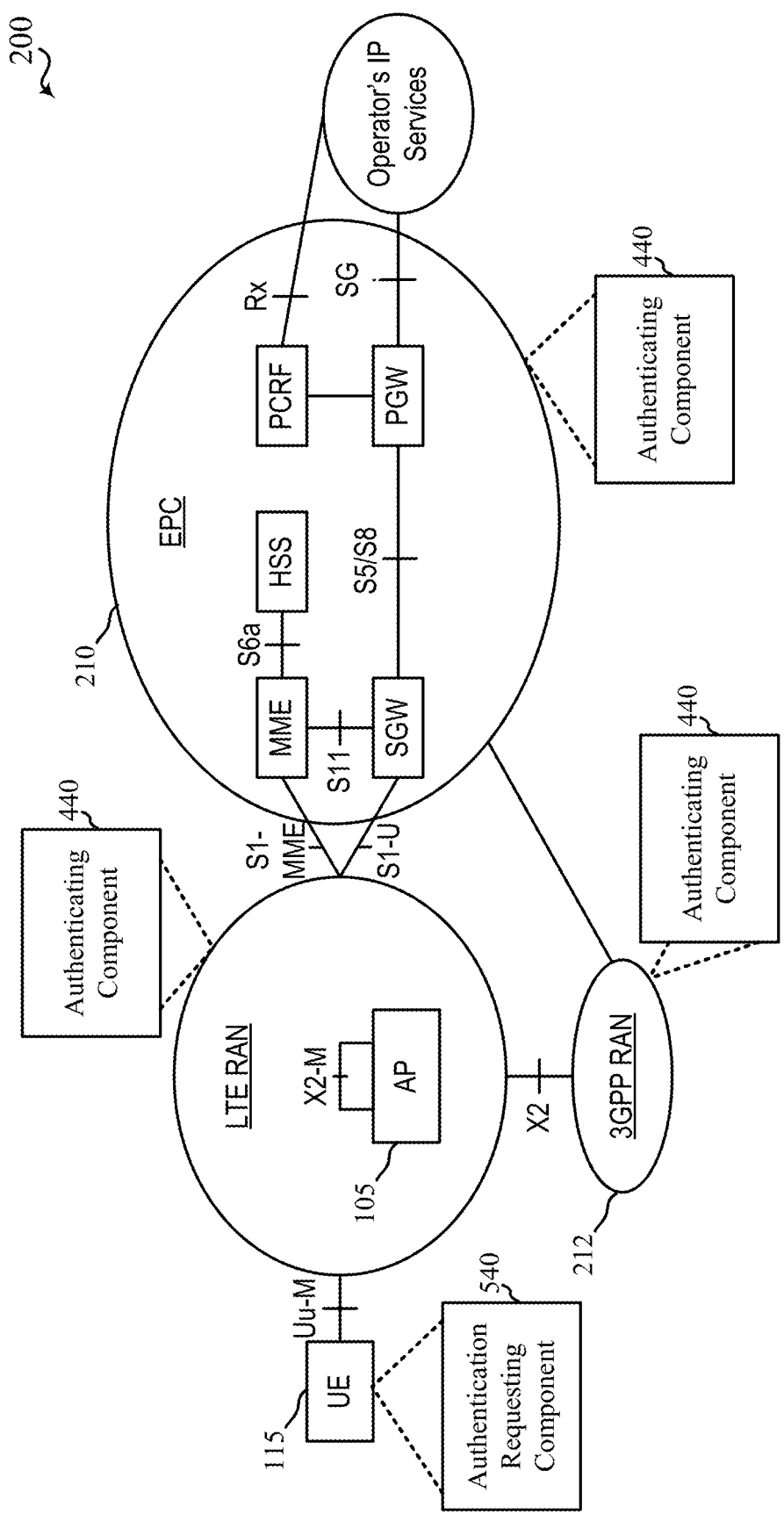
FIG. 2 illustrates an example of a wireless communication system with public land mobile network based authentication, in accordance with various aspects of the present disclosure.

FIG. 2 illustrates an example of a wireless communication system 200 including a UE 115 that can communicate with an access point 105 to access an evolved packet core (EPC) 210, which can be similar to core network 130. UE 115 can access the AP 105, which provides a radio access network (RAN) of a wireless communication technology, such as LTE or a derivative thereof (e.g., LTE in unlicensed band, MuLTEFire, etc.). AP 105 can communicate with a mobility management entity (MME) and/or serving gateway (SGW) of the EPC 210 over a corresponding S1 interface. EPC 210 may also include other nodes for authenticating the UE 115, such as a home subscriber server (HSS), a packet data network (PDN) gateway (PGW), a policy charging and rules function (PCRF), etc. The AP 105 can facilitate access of operator IP services for the UE 115 via the SGW, PGW, and/or other nodes of the EPC 210 once the UE 115 is authenticated, in one example. For example, UE 115 can include an authentication requesting component 540 for requesting authentication to access the EPC 210 and/or corresponding operator's IP services using the modified authentication procedures described herein, and the 3GPP RAN 212, LTE RAN (or components thereof, such as AP 105), EPC 210 and/or various components thereof can include an authenticating component 440 for authenticating the UE 115 using the modified authentication procedures described herein.

In one example, the AP 105 can also connect to a 3GPP RAN 212, or other cellular RAN, to communicate with the EPC 210. In this example, EPC 210 can correspond to a public land mobile network (PLMN) EPC 210, which may include a 3GPP EPC, and AP 105 can accordingly provide a PLMN access mode for authenticating the UE 115 on EPC 210. Thus, for example, AP 105 can support authentication using extensible authentication protocol (EAP) authentication and key agreement (AKA), or a derivative thereof such as extensible authentication protocol (EAP)-AKA' or other evolved packet system (EPS) AKA procedures, using IMSI-based credentials hosted in a USIM of the UE 115 via a connected HSS in the EPC 210 by communicating with the 3GPP RAN 212 to access EPC 210 for authenticating the UE 115. Thus, for example, the EAP-AKA procedure described herein can use symmetric keys (e.g., the USIM subscription and corresponding pre-shared keys) for authentication, as opposed to asymmetric keys used in other EAP procedures, such as EAP-TLS. For example, in this regard, AP 105 can support EAP-AKA', as described in Internet Engineering Task Force (IETF) Request for Comments (RFC) 5448 and/or as discussed for use in 3GPP in 3GPP Technical Specification (TS) 33.402 version 13.0.0, which may use IMSI-based credentials hosted in a USIM of the UE 115, as described above. In one example, a USIM subscription can include a subscription that is associated with USIM application defined in 3GPP TS 31.102. For instance, the credentials associated a USIM subscription can be stored as part of the USIM application. The USIM application may run in a Universal Integrated Circuit Card (UICC), embedded UICC (eUICC), a secure element, softSIM or a secure processor, etc. of the UE 115.

Figure 3:
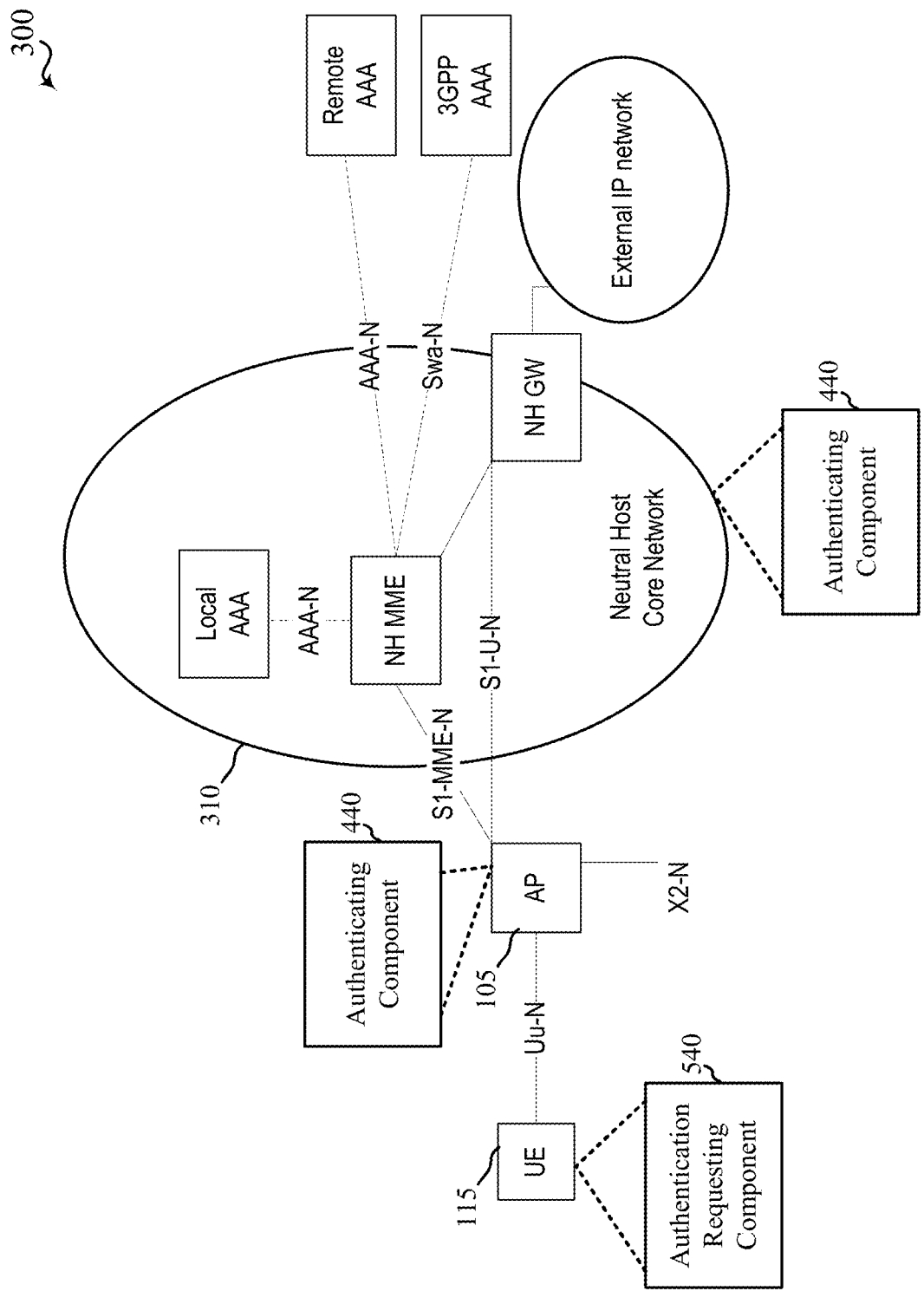
FIG. 3 illustrates an example of a wireless communication system with neutral host network based authentication, in accordance with various aspects of the present disclosure.

FIG. 3 illustrates an example of a wireless communication system 300 including a UE 115 that can communicate with an access point 105 to access a neutral host core network 310, which can be similar to core network 130. UE 115 can access the AP 105, which provides a radio access network (RAN) of a wireless communication technology, such as LTE or a derivative thereof (e.g., LTE in unlicensed band, MuLTEFire, etc.). AP 105 can communicate with a MME of the neutral host core network 310 (NH-MME) or a gateway of the neutral host core network 310 (NH-GW) over a corresponding S1 interface. Neutral host core network 310 may also include other nodes for authenticating the UE 115, such as a local authentication, authorization, and accounting (AAA) server, and/or can communicate with one or more nodes of other networks for authenticating the UE 115, such as a remote AAA, 3GPP AAA, etc. For example, UE 115 can include an authentication requesting component 540 for requesting authentication to access the neutral host core network 310 and/or external IP network using the modified authentication procedures described herein, and the AP 105, neutral host core network 310 and/or various components thereof can include an authenticating component 440 for authenticating the UE 115 using the modified authentication procedures described herein. The AP 105 can facilitate access of an external IP network for the UE 115 via the NH-GW and/or other nodes of the neutral host core network 310 once the UE 115 is authenticated, in one example.

In this example, AP 105 can accordingly provide a neutral host access mode for authenticating the UE 115 on the neutral host core network 310. Thus, for example, AP 105 can support authentication using a version of EAP-AKA' using IMSI-based credentials hosted in a USIM of the UE 115 via authentication with a participating service provider (PSP) AAA/HSS, which may be a 3GPP AAA/HSS. In another example, AP 105 can support authentication using EAP transport layer security (TLS), which uses certificate-based credentials via authentication with a PSP's AAA. This may be used for PSPs that are not MNOs (e.g., do not have a PLMN-ID, and/or do not issue SIMs/eSIMs). As described, in this example, the UE 115 may securely store and manage a certificate for EAP-TLS. In other examples, AP 105 can support modified 3GPP system selection.

In one example, as described further herein, AP 105 can advertise a PSP identifier (PSP-ID) that identifies a service provider providing subscriptions on the neutral host core network 310. The PSP-ID can be used for network selection where the UE 115 can match a PSP-ID broadcasted by the AP 105 with an identifier associated with a subscription for the neutral host core network 310, which may be stored in a modified USIM subscription, as described herein. In an example, the PSP-ID may be of one of multiple PSP identifier types. For example, the PSP types may include a PLMN based PSP-ID (e.g., PSP-ID is a PLMN-ID of the PSP, which may be 24 bits and/or broadcast in an information element (IE) of system information by the access point with a list of PLMN-IDs based on PSP-IDs). In addition, for example, the PSP types may include an operator identifier (OID) based PSP-ID (e.g., where the PSP-OD is the OID of the PSP, which may be 24 bits and/or broadcast in an IE of system information with a list of OID based PSP-IDs). Moreover, for example, the PSP types may include a domain name based PSP-ID and OID based PSP-ID with OID longer than a threshold length (e.g., longer than 24 bits). In one example, a 24-bit hash of the PSP-ID can be broadcasted in an IE of system information with a list of such hashes.

In an example, as described further herein, UE 115 can determine a subscriber identifier for accessing the neutral host core network 310 based on the PSP-ID by determining, from a modified USIM subscription, the subscriber identifier corresponding to the PSP-ID. In an example, the subscriber identifier may be generated from a modified mobile subscriber identity that may be associated with the PSP and the PSP-ID stored in the modified USIM subscription. For example, UE 115 may specify the subscriber identifier as part of a modified EAP-AKA' procedure with the AP 105 and/or nodes of the neutral host core network 310 via the AP 105. In addition, for example, the neutral host access mode identifier (NHAMI) of the AP 105 (e.g., as defined in MuLTEFire Alliance Technical Specification MF.202) may be used as a PLMN-ID when operating in neutral host network (NHN) access mode (AM). In this example, using the USIM to store the modified subscription may be inherently secure (as USIM is a secure element), and the AP 105 or other nodes of the neutral host core network 310 or other networks (via a AP 105) can provision subscription information (e.g., the modified USIM subscription or portion thereof) to the UE 115 for secured storage thereof. In an example, provisioning subscription information in this regard may include indicating changes to provision modified profiles.

Figure 4:
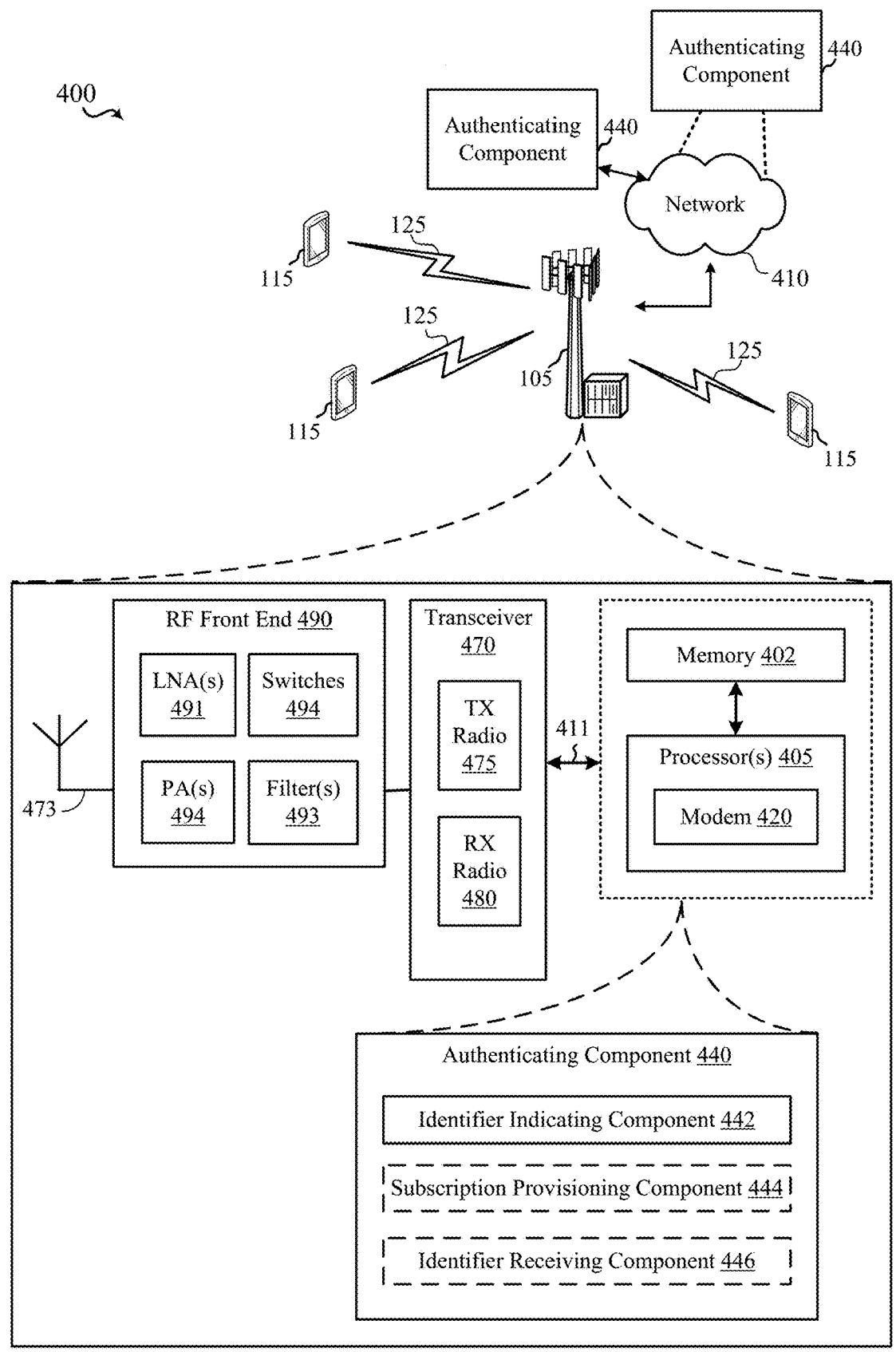
FIG. 4 is a block diagram illustrating an example of a base station, in accordance with various aspects of the present disclosure.
Figure 5:
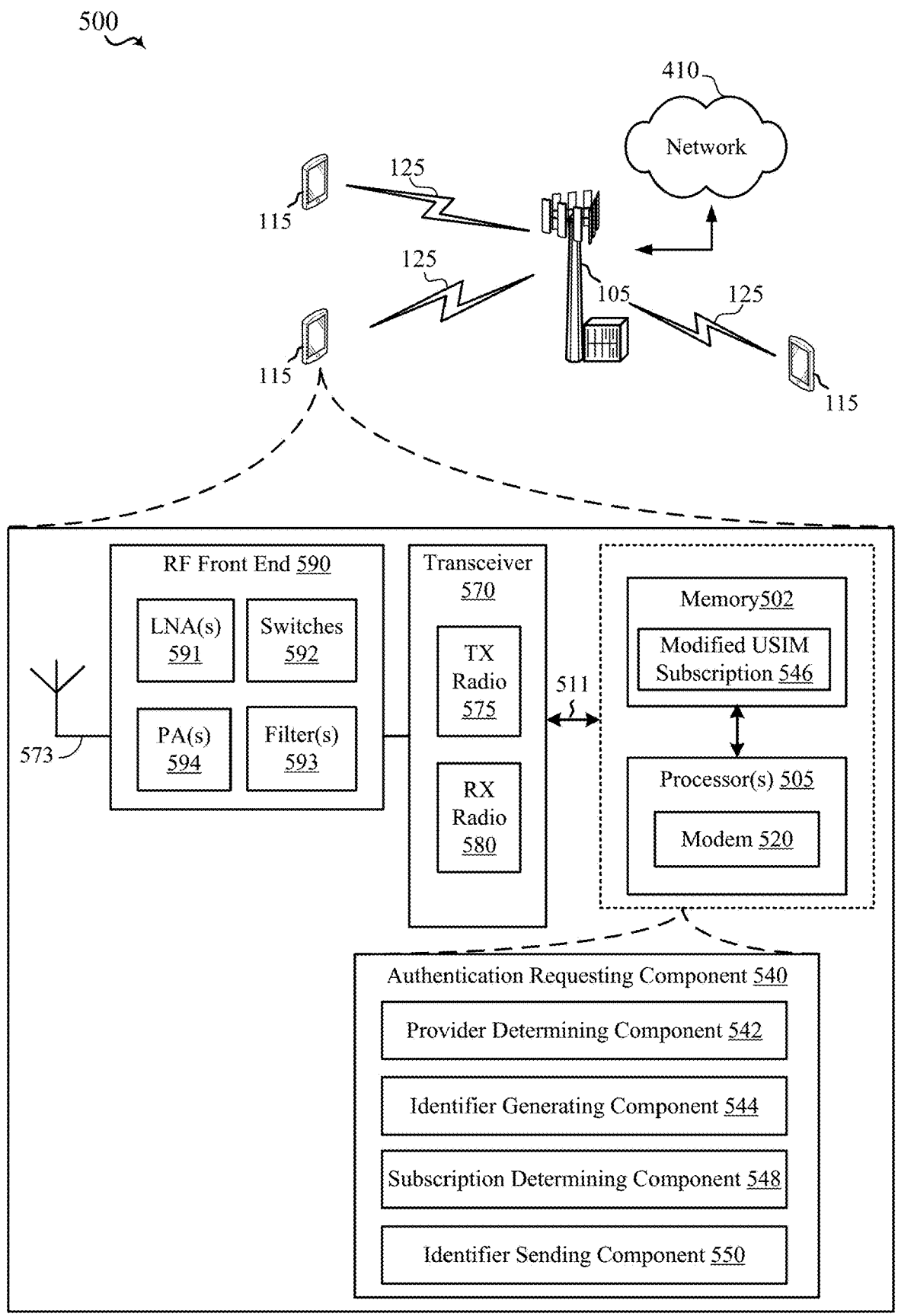
FIG. 5 is a block diagram illustrating an example of a UE, in accordance with various aspects of the present disclosure.
Figure 6:
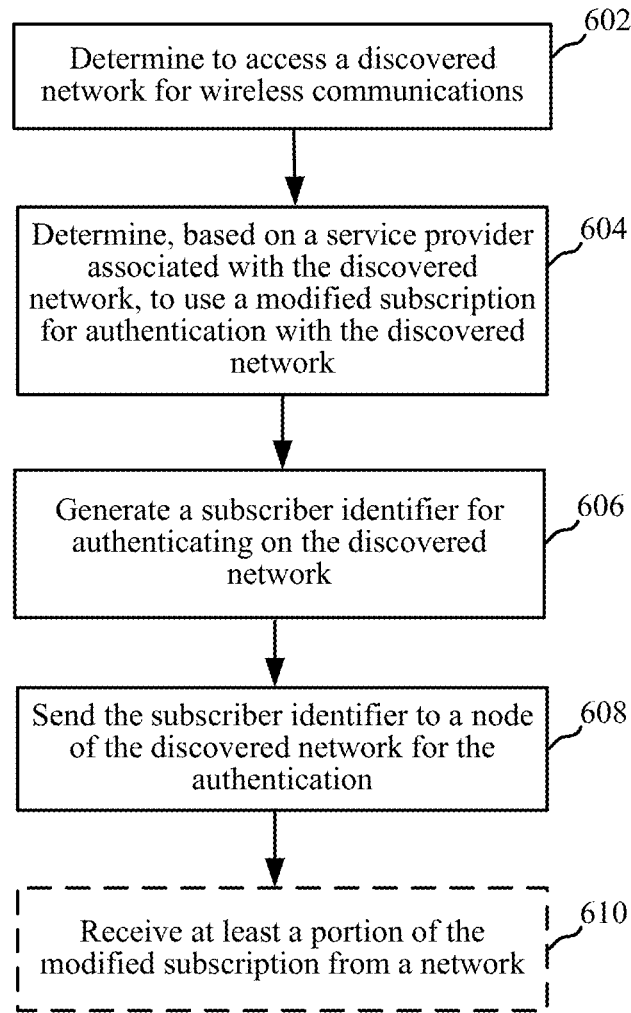
FIG. 6 is a flow chart illustrating an example of a method for requesting authentication, in accordance with various aspects of the present disclosure.
Figure 7:
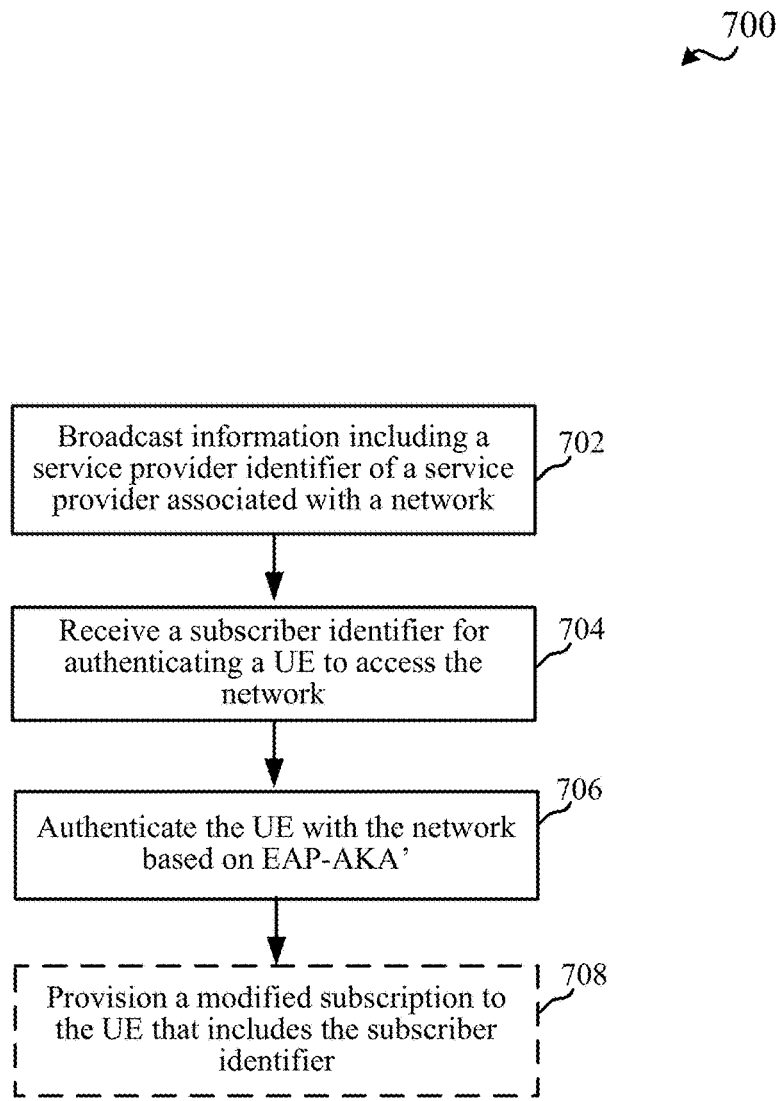
FIG. 7 is a flow chart illustrating an example of a method for authenticating user equipment, in accordance with various aspects of the present disclosure.
Figure 8:
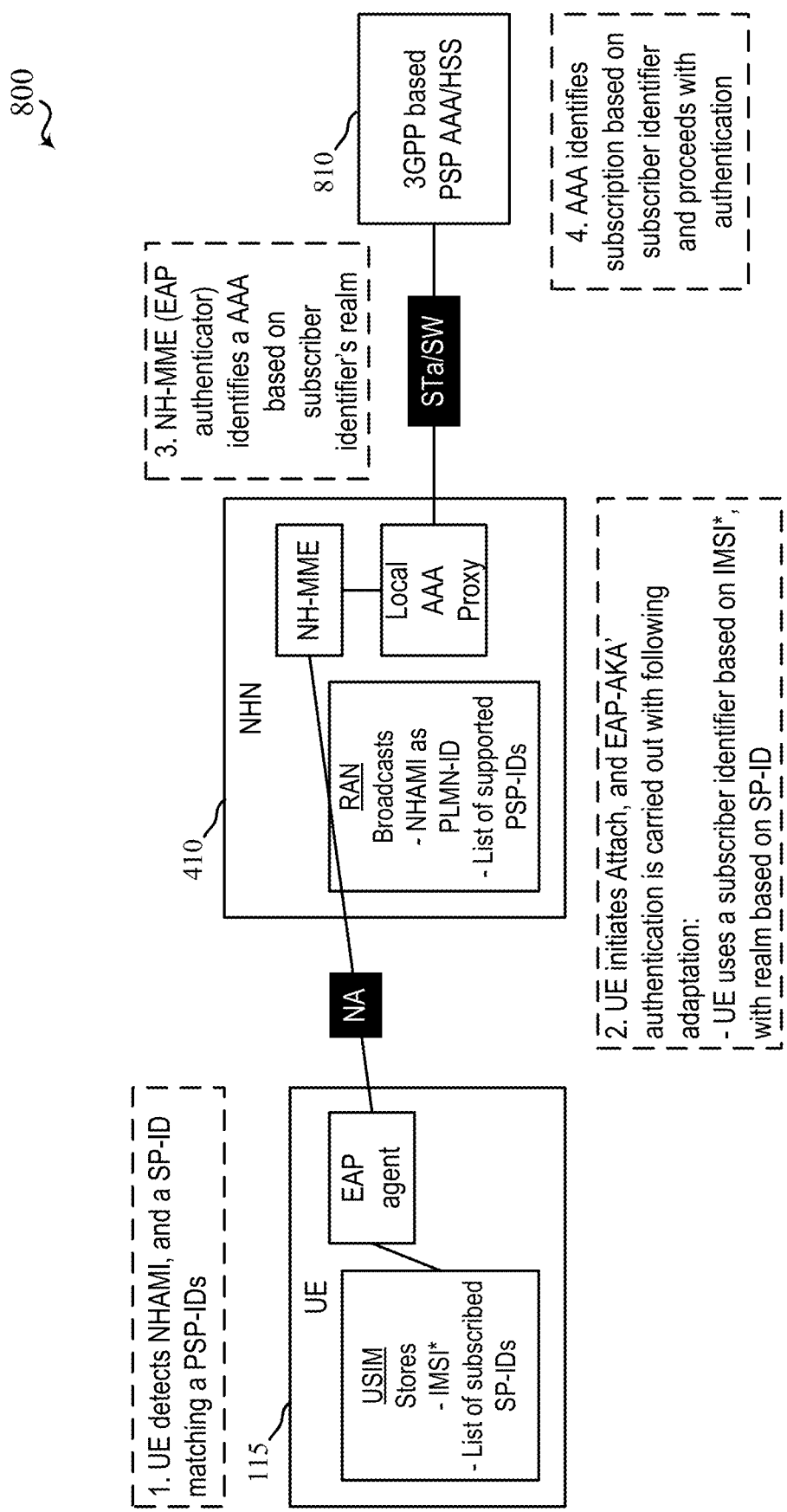
FIG. 8 illustrates an example of a wireless communication system for authenticating a user equipment via a neutral host network, in accordance with various aspects of the present disclosure.

Turning now to FIGS. 4-9, aspects are depicted with reference to one or more components and one or more methods that may perform the actions or operations described herein, where aspects in dashed line may be optional. Although the operations described below in FIGS. 6-8 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 4, a block diagram 400 is shown that includes a portion of a wireless communications system having multiple UEs 115 in communication with a base station 105 (also referred to more generally herein as an access point) via communication links 125, where the base station 105 is also connected to a network 410. The UEs 115 may be examples of the UEs described in the present disclosure that are configured to request authentication to a network, such as a NHN. Moreover the base station 105 may be an example of the access points/base stations described in the present disclosure (e.g., eNB, gNB, other types of access points, etc. providing one or more macrocells, small cells, etc.) that are configured to authenticate a UE via network 410 that may correspond to a NHN. Moreover, core network 410 can include, be part of, be implemented in or include one or more components of, etc., one or more of the core networks described herein, such as EPC 210, NHN core network 310, etc.

In an aspect, the base station in FIG. 4 may include one or more processors 405 and/or memory 402 that may operate in combination with an authenticating component 440 to perform the functions, methods (e.g., method 700 of FIG. 7), etc. presented in the present disclosure. In accordance with the present disclosure, the authenticating component 440 may include one or more components for authenticating a UE 115 on a core network 410, such as an identifier indicating component 442 for broadcasting a service provider identifier of one or more service identifiers related to network 410, an optional subscription provisioning component 444 for provisioning a modified subscription to the UE 115, and/or an optional identifier receiving component 446 for receiving, from the UE 115, a subscriber identifier for authenticating the UE 115 to access the network 410. As described, core network 410 may additionally or alternatively include or be communicatively coupled with an authenticating component 440, or portion thereof, to perform the authenticating functions described herein. The authenticating component(s) 440 of the core network or communicatively coupled therewith can include similar components, including identifier indicating component 442, subscription provisioning component 444 and/or identifier receiving component 446. For example, in this regard, a subscription provisioning component 444 that may be outside of, and communicatively coupled to the core network 410, may include a one or more nodes defined in Global System for Mobile Communications Association (GSMA) Remote Provisioning specifications and/or Remote SIM Provisioning (RSP) specifications, such as Subscription Manager—Secure Routing (SM-SR), Subscription Manager—Data Preparation (SM-DP), SM-DP+, Subscription Manager—Discovery Server (SM-DS), eUICC Manufacturer (EUM), Certificate Issuer (CI), Network operator nodes, etc. Moreover, in an example, some components and/or functions of the authenticating component 440 may be present within or performed by the base station 105 while others are present within and/or performed by other components of the network 410.

The one or more processors 405 may include a modem 420 that uses one or more modem processors. The various functions related to the authenticating component 440, and/or its sub-components, may be included in modem 420 and/or processor 405 and, in an aspect, can be executed by a single processor, while in other aspects, different ones of the functions may be executed by a combination of two or more different processors. For example, in an aspect, the one or more processors 405 may include any one or any combination of a modem processor, or a baseband processor, or a digital signal processor, or a transmit processor, or a transceiver processor associated with transceiver 470, or a system-on-chip (SoC). In particular, the one or more processors 405 may execute functions and components included in the authenticating component 440. In another example, authenticating component 440 may operate at one or more communication layers, such as a physical layer (e.g., layer 1 (L1)), media access control (MAC) layer (e.g., layer 2 (L2)), PDCP layer or RLC layer (e.g., layer 3 (L3)), etc., to broadcast PSP-IDs, NHAMIs, receive authentication information from UEs, etc.

In some examples, the authenticating component 440 and each of the sub-components may comprise hardware, firmware, and/or software and may be configured to execute code or perform instructions stored in a memory (e.g., a computer-readable storage medium, such as memory 402 discussed below). Moreover, in an aspect, the base station 105 in FIG. 4 may include a radio frequency (RF) front end 490 and transceiver 470 for receiving and transmitting radio transmissions to, for example, UEs 115. The transceiver 470 may coordinate with the modem 420 to receive signals for, or transmit signals generated by, the authenticating component 440 to the UEs. RF front end 490 may be connected to one or more antennas 473 and can include one or more switches 492, one or more amplifiers (e.g., power amplifiers (PAs) 494 and/or low-noise amplifiers 491), and one or more filters 493 for transmitting and receiving RF signals on uplink channels and downlink channels, transmitting and receiving signals, etc. In an aspect, the components of the RF front end 490 can connect with transceiver 470. The transceiver 470 may connect to one or more of modem 420 and processors 405.

The transceiver 470 may be configured to transmit (e.g., via transmitter (TX) radio 475) and receive (e.g., via receiver (RX) radio 480) wireless signals through antennas 473 via the RF front end 490. In an aspect, the transceiver 470 may be tuned to operate at specified frequencies such that the base station 105 can communicate with, for example, UEs 115. In an aspect, for example, the modem 420 can configure the transceiver 470 to operate at a specified frequency and power level based on the configuration of the base station 105 and communication protocol used by the modem 420.

The base station 105 in FIG. 4 may further include a memory 402, such as for storing data used herein and/or local versions of applications or authenticating component 440 and/or one or more of its sub-components being executed by processor 405. Memory 402 can include any type of computer-readable medium usable by a computer or processor 405, such as random access memory (RAM), read only memory (ROM), tapes, magnetic discs, optical discs, volatile memory, non-volatile memory, and any combination thereof. In an aspect, for example, memory 402 may be a computer-readable storage medium that stores one or more computer-executable codes defining authenticating component 440 and/or one or more of its sub-components. Additionally or alternatively, the base station 105 may include a bus 411 for coupling one or more of the RF front end 490, the transceiver 474, the memory 402, or the processor 405, and to exchange signaling information between each of the components and/or sub-components of the base station 105.

In an aspect, the processor(s) 405 may correspond to one or more of the processors described in connection with the base station in FIG. 9. Similarly, the memory 402 may correspond to the memory described in connection with the base station in FIG. 9.

Referring to FIG. 5, a block diagram 500 is shown that includes a portion of a wireless communications system having multiple UEs 115 in communication with a base station 105 (also referred to more generally herein as an access point) via communication links 125, where the base station 105 is also connected to a network 410. The UEs 115 may be examples of the UEs described in the present disclosure that are configured to request authentication to a network, such as a NHN. Moreover the base station 105 may be an example of the access points/base stations described in the present disclosure (e.g., eNB, gNB, other types of access points, etc. providing one or more macrocells, small cells, etc.) that are configured to authenticate a UE via a core network 410 that may correspond to a NHN. Moreover, core network 410 can include, be part of, be implemented in or include one or more components of, etc., one or more of the core networks described herein, such as EPC 210, NHN core network 310, etc.

In an aspect, the UE 115 in FIG. 5 may include one or more processors 505 and/or memory 502 that may operate in combination with an authentication requesting component 540 to perform the functions, methods (e.g., method 600 of FIG. 6), etc., presented in the present disclosure. In accordance with the present disclosure, the authentication requesting component 540 may include one or more components for requesting authentication on a core network 410, such as a provider determining component 542 for determining a service provider associated with a network accessible via base station 105, an identifier generating component 544 for generating a subscriber identifier for transmitting in a request to authenticate the UE 115 on the network 410 (e.g., as sent to the base station 105), a subscription determining component 548 for determining, based on the determined service provider, to use a modified subscription (e.g., stored on the UE 115) for authentication with a discovered network, and/or an identifier sending component 550 for sending the subscriber identifier to a node of the discovered network for authentication. In one example, identifier generating component 544 can select the subscriber identifier, or generate the subscriber identifier, from one or more identifiers in a modified USIM subscription 546 stored in memory 502 of the UE. In this regard, the memory 502 may be or may include a USIM that stores modified subscription information for one or more service providers, as described further herein.

The one or more processors 505 may include a modem 520 that uses one or more modem processors. The various functions related to the authentication requesting component 540, and/or its sub-components, may be included in modem 520 and/or processor 505 and, in an aspect, can be executed by a single processor, while in other aspects, different ones of the functions may be executed by a combination of two or more different processors. For example, in an aspect, the one or more processors 505 may include any one or any combination of a modem processor, or a baseband processor, or a digital signal processor, or a transmit processor, or a transceiver processor associated with transceiver 570, or a system-on-chip (SoC). In particular, the one or more processors 505 may execute functions and components included in the authentication requesting component 540. In another example, authentication requesting component 540 may operate at one or more communication layers, such as physical layer or L1, MAC layer or L2, a PDCP/RLC layer or L3, etc., to determine PSP-IDs, subscriber identifiers, generate and transmit messages for authentication, etc.

In some examples, the authentication requesting component 540 and each of the sub-components may comprise hardware, firmware, and/or software and may be configured to execute code or perform instructions stored in a memory (e.g., a computer-readable storage medium, such as memory 502 discussed below). Moreover, in an aspect, the UE 115 in FIG. 5 may include an RF front end 590 and transceiver 570 for receiving and transmitting radio transmissions to, for example, base stations 105. The transceiver 570 may coordinate with the modem 520 to receive signals that include packets (e.g., and/or one or more related PDUs). RF front end 590 may be connected to one or more antennas 573 and can include one or more switches 592, one or more amplifiers (e.g., PAs 594 and/or LNAs 591), and one or more filters 593 for transmitting and receiving RF signals on uplink channels and downlink channels. In an aspect, the components of the RF front end 590 can connect with transceiver 570. The transceiver 570 may connect to one or more of modem 520 and processors 505.

The transceiver 570 may be configured to transmit (e.g., via transmitter (TX) radio 575) and receive (e.g., via receiver (RX) radio 580) wireless signals through antennas 573 via the RF front end 590. In an aspect, the transceiver 570 may be tuned to operate at specified frequencies such that the UE 115 can communicate with, for example, base stations 105. In an aspect, for example, the modem 520 can configure the transceiver 570 to operate at a specified frequency and power level based on the configuration of the UE 115 and communication protocol used by the modem 520.

The UE 115 in FIG. 5 may further include a memory 502, such as for storing data used herein and/or local versions of applications or authentication requesting component 540 and/or one or more of its sub-components being executed by processor 505. Memory 502 can include any type of computer-readable medium usable by a computer or processor 505, such as RAM, ROM, tapes, magnetic discs, optical discs, volatile memory, non-volatile memory, and any combination thereof. In an aspect, for example, memory 502 may be a computer-readable storage medium that stores one or more computer-executable codes defining authentication requesting component 540 and/or one or more of its sub-components. Additionally or alternatively, the UE 115 may include a bus 511 for coupling one or more of the RF front end 590, the transceiver 574, the memory 502, or the processor 505, and to exchange signaling information between each of the components and/or sub-components of the UE 115.

In an aspect, the processor(s) 505 may correspond to one or more of the processors described in connection with the UE in FIG. 9. Similarly, the memory 502 may correspond to the memory described in connection with the UE in FIG. 9.

FIG. 6 illustrates a flow chart of an example of a method 600 for requesting (e.g., by a UE) authentication on a network.

At Block 602, it can be determined to access a discovered network for wireless communications. In an aspect, authentication requesting component 540, e.g., in conjunction with processor(s) 505, memory 502, transceiver 570, etc., can determine to access the discovered network for wireless communications. In an example, as described herein, a base station or other access point 105 can transmit information regarding the base station 105 and/or the corresponding core network 410, which may be similar to core network 130, 210, 310, etc. The information may include a service provider identifier of a service provider associated with the core network 410 and/or associated with one or more services provided at the core network 410. For example, the service provider identifier may include a PSP-ID that may be of one of multiple types, as described (e.g., PLMN-ID based, OID based, domain name based, etc.). For example, the PSP-ID may include a domain-based service provider identifier based on domain name and/or an OID-based service provider identifier based on an OID (e.g., and/or a service provider identifier based on both a domain name and an OID), as described in MuLTEFire Alliance Technical Specification MF.202. The base station 105 can broadcast the service provider identifier in an IE of system information. In any case, the UE 115 can receive and process the information transmitted by the base station 105 (e.g., based on receiving the information in the system information broadcast, such as a system information block (SIB), or other signals). In an example, authentication requesting component 540 can determine to access the discovered network (e.g., via base station 105) based on the service provider identifier, based on determining that the service provider identifier matches an identifier in a modified USIM subscription 546, which may be stored in memory 502 on the UE 115, etc.

At Block 604, it can be determined, based on a service provider associated with the discovered network, to use a modified subscription for authentication with the discovered network. In an aspect, subscription determining component 548, e.g., in conjunction with processor(s) 505, memory 502, transceiver 570, authentication requesting component 540, provider determining component 542, etc., can determine, based on the service provider associated with the discovered network, to use the modified subscription (e.g., a modified USIM subscription stored in the UE 115) for authentication with the discovered network. For example, as described in this regard, subscription determining component 548 can match the service provider identifier advertised by the discovered network (e.g., by the AP 105) with an identifier in a modified USIM subscription 546, which may be stored in memory 502 on the UE 115. In this example, subscription determining component 548 can consider the PSP-ID types described above (e.g., PLMN-ID-based, OID-based, and domain-name based), such that during network selection, the UE 115 determines whether its subscription is supported by a network by checking if a PSP-ID associated with the subscription matches a PSP-ID broadcasted by the network. In an example, only PLMN-ID-based PSP-IDs may be considered for an attach using regular EAP-AKA'. In one example, the modified USIM subscription 546 can be associated with multiple service provider identifiers, as described, that include at least one of a service provider identifier based on a domain name or a service provider identifier based on an OID.

Moreover, in an example, the modified USIM subscription can be associated with USIM application that uses the same Application Identifier as a USIM application for a USIM subscription that is not modified in the UE 115. For example, the Application Identifier can be used to identify USIM applications, such as 3GPP Application Identifiers defined in Annex E of European Telecommunications Standards Institute (ETSI) TS 101 220. In another example, the modified USIM subscription can be associated with USIM application that uses a different Application Identifier than that of any USIM subscription that is not modified in the UE 115. In addition, for example, one or more of the multiple service provider identifiers can be stored in a file (e.g., on the UE 115, a memory 502 of the UE, which may include a USIM, etc.) of a USIM application associated with the modified USIM subscription, a management object associated with the modified USIM subscription, a file associated with the modified USIM subscription stored in a secure element of the UE 115, or a file associated with the modified USIM subscription stored in a memory 502 of the UE 115. In addition, in an example, subscription determining component 548 can identify a type of the service provider identifier (e.g., whether the PSP-ID is PLMN-based, OID-based, domain-based, etc.), contents of the service provider identifier (e.g., a PLMN, OID, or domain name portion of the PSP-ID, etc.), and/or the like, which may allow for determining to use the modified subscription.

At 606, a subscriber identifier for authenticating on the discovered network can be generated. In an aspect, identifier generating component 544, e.g., in conjunction with processor(s) 505, memory 502, transceiver 570, authentication requesting component 540, etc., can generate, or otherwise obtain, the subscriber identifier for authenticating on the discovered network (e.g., network 410). For example, identifier generating component 544 can select a subscriber identifier associated with the service provider identifier located in the modified USIM subscription 546. In another example, identifier generating component 544 can generate the subscriber identifier based on the service provider identifier and an associated modified mobile subscriber identity, as described in further detail herein. In some examples, however, the subscriber identifier can be received and stored by the UE 115, in the modified USIM subscription 546. In addition for example, the subscriber identifier can have been previously generated, by the UE 115 or by a device provisioning the subscriber identifier to the UE 115 (e.g., base station 105, component of the network 410, etc.), based on the service provider identifier and associated modified mobile subscriber identity.

For example, the modified USIM subscription 546 can include a list of service provider identifiers (e.g., PSP-IDs) and associated modified mobile subscriber identities (e.g., modified IMSIs) that can be used by the UE 115 to authenticate on a neutral host network (e.g., network 410) associated with the service provider. The USIM subscription can, for example, be provisioned (as an initial subscription and/or an updated subscription) to the UE 115 by base station 105, a component of network 410, and/or the like, can be stored in the modified USIM subscription 546 as embedded or inserted in the UE 115, etc. As described, the PSP-IDs may be of different types (e.g., PLMN-ID based, OID based, domain name based, etc.), and the modified USIM subscription 546 may include multiple PSP-IDs where at least two of the PSP-IDs may be of a different type. The PSP-IDs can be stored in the modified USIM subscription 546 to prevent easy/unintentional alterations thereto, and/or can use similar access conditions of an IMSI also stored in the USIM. The mobile entity (ME)-USIM interface can support accessing any file (e.g., which may include a list of PSP-IDs).

In an example, the modified mobile subscriber identities stored in the modified USIM subscription 546 may include a value for a subscription assigned by the service provider associated with the subscription (e.g., associated with the PSP-ID). In one example, the modified mobile subscriber identity can have a similar or same structure as an IMSI, and may include a PLMN-ID and a mobile subscription identification number (MSIN). For a given service provider, for example, the MSIN of each modified mobile subscriber identity associated with the service provider can be unique, to facilitate identifying the subscribed UE. In another example, a mobile code tuple, such as the mobile country code (MCC) and mobile network code (MNC) field, of the modified mobile subscriber identity, having the same or similar structure as an IMSI, can be set to the NHAMI. In yet another example, the modified mobile subscriber identity can have a similar or same structure as a Subscriber Permanent Identifier (SUPI) (e.g., as defined in 3GPP TS 23.501). In addition, for example, a same application identifier as that of a USIM application can be used in the modified USIM subscription. In this example, legacy UEs may treat the neutral host core network 410 as an unavailable operator since the home PLMN (HPLMN) is not the same as NHAMI. For example, a legacy UE that is provisioned with the modified USIM subscription may not access networks unless a NHAMI based PSP-ID is broadcasted.

In specific examples, the subscriber identifier stored in the modified USIM subscription may be in the form of a network access identifier (NAI) (e.g., as used for authentication, fast re-authentication, etc.) and can be constructed using the modified mobile subscriber identity and a home network realm set to a certain string (e.g., "epc.psp-id<psp-id>.mfanetwork.org" instead of a NAI specified for EAP-AKA' in 3GPP, such as "epc.mnc<MNC>.mcc<MCC>.3GPPnetwork.org"). For example, a root NAI used for EAP-AKA' can be "6<IMSI*>@nai.epc.psp-id<psp-id>.mfanetwork.org," e.g., instead of "6<IMSI*>@nai.epc.mnc<MNC>.mcc<MCC>.3GPP network.org," where IMSI* can be the modified mobile subscriber identity associated with the service provider identifier (e.g., the PSP-ID). Similarly, a decorated NAI may be "nai.epc.psp-id<psp-id>.mfanetwork.org!6<IMSI*>@otherrealm" instead of a 3GPP decorated NAI "nai.epc.mnc<homeMNC>.mcc<homeMCC>.3GPP network.org!6<IMSI>@otherrealm."

At Block 608, the subscriber identifier can be sent to a node of the discovered network for the authentication. In an aspect, identifier sending component 550, e.g., in conjunction with processor(s) 505, memory 502, transceiver 570, authentication requesting component 540, etc., can send the subscriber identifier to the node of the discovered network for authentication. For example, identifier sending component 550 can send the subscriber identifier to one or more nodes of the neutral host core network 410 via the base station 105 in one or more messages. The one or more message, for example, may include an attach request to attach to the network 410, a response to an authentication request received by the UE 115 from the network 410, etc. Moreover, identifier sending component 550 can determine a type of authentication for sending the subscriber identifier, where the determination may be based on the service provider, a type of the PSP-ID, etc. For example, identifier sending component 550 can determine the type of authentication (or an authentication type for the PSP-ID) as regular EAP-AKA' and can send the subscriber identifier in a regular EAP-AKA' message where the PSP-ID is PLMN-ID based. For other types of authentication (and/or authentication types for a given PSP-ID), for example, identifier sending component 550 can select a different type of EAP-AKA' authentication type and associated messages, as described herein.

Optionally, at Block 610, at least a portion of the modified subscription can be received from a network. In an aspect, authentication requesting component 540, e.g., in conjunction with processor(s) 505, memory 502, transceiver 570, etc., can receive at least the portion of the modified subscription from the network. For example, authentication requesting component 540 can receive the modified USIM subscription 546, or at least a portion (e.g., an update of one or more records in the list), from network 410 via base station 105, or from a different subscription provisioning network (e.g., a network different from network 410). In one example, neutral home network subscription provisioning can be similar to a RSP defined in some radio access technologies, such as GSMA. In this example, a provisioning/bootstrap profile is used by the authentication requesting component 540 to connect to the NHN to a provisioning server that provisions subscription for the network. In this example, the provisioning/bootstrap profile can be an IMSI*-based profile that uses modified EAP-AKA', as described above, and the bootstrap connectivity provider PSP-ID can be stored in the modified USIM subscription 546 for the UE 115. Moreover, based on receiving the modified subscription from the network, authentication requesting component 540 can update an initially received (or current) subscription for authenticating in the network 410.

FIG. 7 illustrates a flow chart of an example of a method 700 for authenticating (e.g., by a base station) a UE on a neutral host network.

In method 700, at Block 702, information including a service provider identifier of a service provider associated with a network can be broadcasted. In an aspect, identifier indicating component 442, e.g., in conjunction with processor(s) 405, memory 402, transceiver 470, authenticating component 440, etc., can broadcast the information including the service provider identifier of the service provider associated with the network. For example, identifier indicating component 442 can broadcast the service provider identifier in an IE of system information (e.g., an IE in a SIB or other signals), which may be a PSP-ID, NHAMI, etc., as described above. This can allow the UE 115 to receive the identifier and determine a subscriber identifier, associated with the service provider identifier, for authenticating on the corresponding network.

At Block 704, a subscriber identifier for authenticating a UE to access the network can be received. In an aspect, identifier receiving component 446, e.g., in conjunction with processor(s) 405, memory 402, transceiver 470, authenticating component 440, etc. can receive the subscriber identifier for authenticating the UE to access the network. For example, as described, the UE 115 can transmit the subscriber identifier based on determining which subscriber identifier (e.g., in a modified USIM subscription 546) corresponds to the service provider identifier broadcasted by the network, and can transmit the determined subscriber identifier to the base station 105 for authentication (e.g., in an attach request, another message related to an authentication procedure, etc.). As described, for example, the subscriber identifier may not include a PLMN-ID. Moreover, the subscriber identifier can correspond to (e.g., can be an expected format for) the broadcasted service provider identifier.

At Block 706, the UE can be authenticated with the network based on EAP-AKA'. In an aspect, authenticating component 440, e.g., in conjunction with processor(s) 405, memory 402, transceiver 470, etc. can authenticate the UE with the network based on EAP-AKA'. In an example, authenticating component 440 can authenticate the UE based on a modification of EAP-AKA', where the modification includes communicating the subscriber identifier with the service provider for authentication, as described. For example, authenticating component 440 can pass the subscriber identifier received from the UE 115 to one or more nodes in the core network 410 to facilitate authenticating the UE 115. In addition, the authenticating component 440 may receive a response from the one or more nodes to forward to the UE 115. As described, this subscriber identifier can be generated using, or otherwise based on, the service provider identifier and the modified mobile subscriber identity, which the network 410 can use to process authentication of the subscriber (e.g., of the UE 115). For example, the network may recognize the new format of the modified mobile subscriber identity, may identify an associated 3GPP AAA based on the realm, and may direct authentication signaling to the 3GPP AAA via a local AAA proxy, as described. Similarly, some network components (e.g., AAA/HSS) can recognize the new format of the modified mobile subscriber identity, and may accordingly map to the correct subscription. Where the UE 115 is authenticated, for example, base station 105 can receive and forward further communications from the UE 115 to the network 410.

Optionally, at Block 708, a modified subscription, that includes the subscriber identifier, can be provisioned to the UE. In an aspect, subscription provisioning component 444, e.g., in conjunction with processor(s) 405, memory 402, transceiver 470, authenticating component 440, etc. can provision the modified subscription that includes the subscriber identifier to the UE. For example, subscription provisioning component 444 can provision the modified USIM subscription 546 to the UE 115 and/or one or more portions thereof. For example, subscription provisioning component 444 can provision an update to the modified USIM subscription 546 (e.g., including an additional subscription to a service provider) to the UE 115, and the UE can accordingly alter the modified USIM subscription 546.

In one example, private network subscription provisioning can be an adaptation of GSMA-RSP, as described, where subscription provisioning component 444 can use a provisioning/bootstrap profile to connect to MF NHN network to connect to provisioning server that provisions the subscription for the network. Additionally, for example, the subscription profile used may be a modification of regular profiles, modified to store PSP-ID. In addition, the provisioning/bootstrap profile can be IMSI*-based profile and can use EAP-AKA' modified as described above. The bootstrap connectivity provider's PSP-ID can be stored in the profile. In this example, subscription provisioning component 444 can obtain the subscriptions in this regard, and provision such modified subscriptions to the UE 115, as described (e.g., based on IMSI* received or determined for the UE 115, etc.). In addition, for example, subscription provisioning component 444 can set a HPLMN-ID of the subscription to a specific value to indicate (e.g., to the UE 115) that the USIM subscription profile has been modified. The UE 115 may detect this HPLMN-ID, and may accordingly update its USIM subscription profile, as described above, based on the modified subscription information received from the base station 105.

FIG. 8 illustrates another example of a system 800 for authenticating a UE using a modified EAP-AKA' procedure. System 800 includes a UE 115 that can access a NHN 410 to attempt authentication to access IP services. UE 115 can detect the NHN 410 based on an NHAMI broadcasted by the NHN 410 (e.g., as a PLMN-ID), a list of PSP-IDs broadcasted (e.g., in system information), etc. The UE 115 can match the NHAMI, or a corresponding SP-ID, to a PSP-ID in a list of PSP-IDs stored in a USIM of the UE 115. The list can also include a subscriber identifier associated with the matching PSP-ID and/or the UE 115 can generate the subscriber identifier based on the PSP-ID and a modified mobile subscriber identity (e.g., IMSI*). UE 115 can initialize an EAP agent based on the subscriber identifier, and can transmit a network access request to the NHN 410 (e.g., and/or to an NH-NME via the RAN of the NHN 410), which may include an attach request. The NH-MME can attempt to authenticate the UE 115 via EAP-AKA' authentication by providing the subscriber identifier to a local AAA proxy in the NHN 410. In an example, the NH-MME identifies an AAA based on a realm identified in the subscriber identifier, and can forward, via the local AAA proxy, the subscriber identifier to a 3GPP based PS AAA/HSS 810 for proceeding with authentication. The 3GPP based PSP AAA/HSS can authenticate the UE 115 based on, e.g., the IMSI* in the subscriber identifier, and can notify the NHN 410, which can accordingly grant access to the UE 115.

Figure 9:
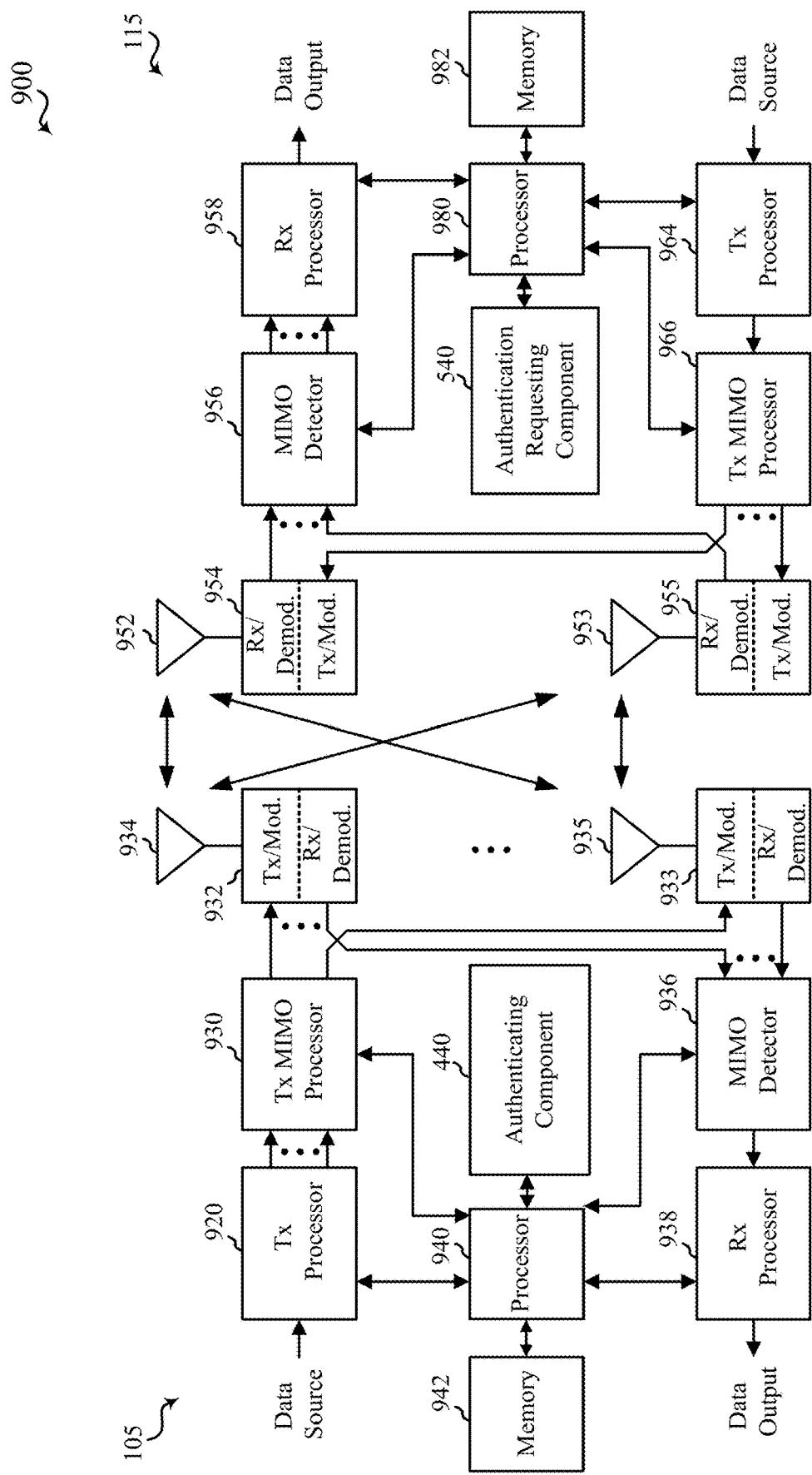
FIG. 9 is a block diagram illustrating an example of a MIMO communication system including a base station and a UE, in accordance with various aspects of the present disclosure.

FIG. 9 is a block diagram of a MIMO communication system 900 including a base station 105 and a UE 115. The MIMO communication system 900 may illustrate aspects of the wireless communication system 100, 200, 300, 800 described with reference to FIGS. 1, 2, 3, 8. The base station 105 may be an example of aspects of the base station 105 described with reference to FIGS. 1-5 and 8. The base station 105 may be equipped with antennas 934 and 935, and the UE 115 may be equipped with antennas 952 and 953. In the MIMO communication system 900, the base station 105 may be able to send data over multiple communication links at the same time. Each communication link may be called a "layer" and the "rank" of the communication link may indicate the number of layers used for communication. For example, in a 2×2 MIMO communication system where base station 105 transmits two "layers," the rank of the communication link between the base station 105 and the UE 115 is two.

At the base station 105, a transmit (Tx) processor 920 may receive data from a data source. The transmit processor 920 may process the data. The transmit processor 920 may also generate control symbols or reference symbols. A transmit MIMO processor 930 may perform spatial processing (e.g., precoding) on data symbols, control symbols, or reference symbols, if applicable, and may provide output symbol streams to the transmit modulator/demodulators 932 and 933. Each modulator/demodulator 932 through 933 may process a respective output symbol stream (e.g., for OFDM, etc.) to obtain an output sample stream. Each modulator/demodulator 932 through 933 may further process (e.g., convert to analog, amplify, filter, and upconvert) the output sample stream to obtain a DL signal. In one example, DL signals from modulator/demodulators 932 and 933 may be transmitted via the antennas 934 and 935, respectively.

The UE 115 may be an example of aspects of the UEs 115 described with reference to FIGS. 1-5 and 8. At the UE 115, the UE antennas 952 and 953 may receive the DL signals from the base station 105 and may provide the received signals to the modulator/demodulators 954 and 955, respectively. Each modulator/demodulator 954 through 955 may condition (e.g., filter, amplify, downconvert, and digitize) a respective received signal to obtain input samples. Each modulator/demodulator 954 through 955 may further process the input samples (e.g., for OFDM, etc.) to obtain received symbols. A MIMO detector 956 may obtain received symbols from the modulator/demodulators 954 and 955, perform MIMO detection on the received symbols, if applicable, and provide detected symbols. A receive (Rx) processor 958 may process (e.g., demodulate, deinterleave, and decode) the detected symbols, providing decoded data for the UE 115 to a data output, and provide decoded control information to a processor 980, or memory 982.

The processor 980 may in some cases execute stored instructions to instantiate an authentication requesting component 540 (see e.g., FIGS. 1 and 5).

On the uplink (UL), at the UE 115, a transmit processor 964 may receive and process data from a data source. The transmit processor 964 may also generate reference symbols for a reference signal. The symbols from the transmit processor 964 may be precoded by a transmit MIMO processor 966 if applicable, further processed by the modulator/demodulators 954 and 955 (e.g., for SC-FDMA, etc.), and be transmitted to the base station 105 in accordance with the communication parameters received from the base station 105. At the base station 105, the UL signals from the UE 115 may be received by the antennas 934 and 935, processed by the modulator/demodulators 932 and 933, detected by a MIMO detector 936 if applicable, and further processed by a receive processor 938. The receive processor 938 may provide decoded data to a data output and to the processor 940 or memory 942.

The processor 940 may in some cases execute stored instructions to instantiate an authenticating component 440 (see e.g., FIGS. 1 and 4).

The components of the UE 115 may, individually or collectively, be implemented with one or more ASICs adapted to perform some or all of the applicable functions in hardware. Each of the noted modules may be a means for performing one or more functions related to operation of the MIMO communication system 900. Similarly, the components of the base station 105 may, individually or collectively, be implemented with one or more ASICs adapted to perform some or all of the applicable functions in hardware. Each of the noted components may be a means for performing one or more functions related to operation of the MIMO communication system 900.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for authentication used by a user equipment (UE), comprising:

determining, by the UE, to access a discovered network for wireless communications;

determining, by the UE, that a public land mobile network (PLMN) identifier advertised by the discovered network is an access mode identifier;

determining, by the UE and based on determining that the PLMN identifier advertised by the discovered network is the access mode identifier, whether a service provider associated with the discovered network matches a service provider identifier stored in a modified universal subscriber identity module (USIM) subscription stored in the UE for authentication with discovered networks that advertise the access mode identifier as the PLMN identifier, wherein the modified USIM subscription is separate from an unmodified USIM subscription in the UE and includes the multiple service provider identifiers including at least one of a domain-based service provider identifier based on a domain name or an operator identifier-based service provider identifier based on an operator identifier;

generating, by the UE and based on determining that the service provider matches the service provider identifier, a subscriber identifier for authenticating on the discovered network, wherein the subscriber identifier is generated based at least in part on the service provider identifier associated with the modified USIM subscription for the service provider and a modified mobile subscriber identity associated with the modified USIM subscription; and sending, by the UE, the subscriber identifier to a node of the discovered network for the authentication.

2. The method of claim 1, wherein the modified USIM subscription is associated with a USIM application that uses a same Application Identifier as a different USIM application defined for the unmodified USIM subscription.

3. The method of claim 1, wherein the modified USIM subscription is associated with a USIM application that uses an Application Identifier different from a different USIM application defined for the unmodified USIM subscription.

4. The method of claim 1, wherein one or more of the multiple service provider identifiers are stored in at least one of a file of a USIM application associated with the modified USIM subscription, a management object associated with the modified USIM subscription, a file associated with the modified USIM subscription stored in a secure element of the UE, or a file associated with the modified USIM subscription stored in a memory of the UE.

5. The method of claim 1, further comprising receiving at least a portion of the modified USIM subscription from a subscription provisioning network.

6. The method of claim 1, wherein the modified USIM subscription includes at least one modified mobile subscriber identity associated with each of the multiple service provider identifiers.

7. The method of claim 1, wherein the modified mobile subscriber identity is at least one of an international mobile subscriber identity (IMSI), a mobile subscription identification number (MSIN), or a subscriber permanent identifier (SUPI), associated with the modified USIM subscription.

8. The method of claim 1, wherein the modified mobile subscriber identity is stored in at least one of a USIM application associated with the modified USIM subscription, a management object associated with the modified USIM subscription, a file associated with the modified USIM subscription stored in a secure element of the UE, or a file associated with the modified USIM subscription stored in a memory of the UE.

9. The method of claim 1, wherein a home public land mobile network (HPLMN) ID included in the modified USIM subscription is set to a specific PLMN-ID indicating that the modified USIM subscription is a modified type of a USIM subscription.

10. The method of claim 9, wherein the specific PLMN-ID is a neutral host access mode identifier.

11. The method of claim 1, wherein the authentication is based on a modification of a derivative of extensible authentication protocol (EAP) authentication and key agreement (AKA) (EAP-AKA'), wherein the modification comprises of identifying the modified USIM subscription used for the authentication using the subscriber identifier.

12. An apparatus for wireless communication, comprising:
a transceiver;
a memory; and
at least one processor communicatively coupled with the transceiver and the memory, wherein the at least one processor is configured to:
determine to access a discovered network for wireless communications;
determine that a public land mobile network (PLMN) identifier advertised by the discovered network is an access mode identifier;
determine, based on determining that the PLMN identifier advertised by the discovered network is the access mode identifier, whether a service provider associated with the discovered network matches a service provider identifier stored in a modified universal subscriber identity module (USIM) subscription stored in the UE for authentication with discovered networks that advertise the access mode identifier as the PLMN identifier, wherein the modified USIM subscription is separate from an unmodified USIM subscription in the UE and includes the multiple service provider identifiers including at least one of a domain-based service provider identifier based on a domain name or an operator identifier-based service provider identifier based on an operator identifier;
generate, based on determining that the service provider matches the service provider identifier, a subscriber identifier for authenticating on the discovered network, wherein the subscriber identifier is generated based at least in part on the service provider identifier associated with the modified USIM subscription for the service provider and a modified mobile subscriber identity associated with the modified USIM subscription; and
send the subscriber identifier to a node of the discovered network for the authentication.

13. The apparatus of claim 12, wherein the modified USIM subscription is associated with a USIM application that uses a same Application Identifier as a different USIM application defined for the unmodified USIM subscription.

14. The apparatus of claim 12, wherein the modified USIM subscription is associated with a USIM application that uses an Application Identifier different from a different USIM application defined for the unmodified USIM subscription.

15. The apparatus of claim 12, wherein one or more of the multiple service provider identifiers are stored in at least one of a file of a USIM application associated with the modified USIM subscription, a management object associated with the modified USIM subscription, a file associated with the modified USIM subscription stored in a secure element, or a file associated with the modified USIM subscription stored in the memory.

16. The apparatus of claim 12, wherein the at least one processor is further configured to receive at least a portion of the modified USIM subscription from a subscription provisioning network.

17. The apparatus of claim 12, wherein the modified USIM subscription includes at least one modified mobile subscriber identity associated with each of the multiple service provider identifiers.

18. The apparatus of claim 12, wherein the modified mobile subscriber identity is at least one of an international mobile subscriber identity (IMSI), a mobile subscription identification number (MSIN), or a subscriber permanent identifier (SUPI), associated with the modified USIM subscription.

19. The apparatus of claim 12, wherein the modified mobile subscriber identity is stored in at least one of a USIM application associated with the modified USIM subscription, a management object associated with the modified USIM subscription, a file associated with the modified USIM subscription stored in a secure element, or a file associated with the modified USIM subscription stored in the memory.

20. The apparatus of claim 12, wherein a home public land mobile network (HPLMN) ID included the modified USIM subscription is set to a specific PLMN-ID indicating that the modified USIM subscription is a modified type of a USIM subscription.

21. A method for authenticating a user equipment (UE) in wireless communications, comprising:
provisioning a modified universal subscriber identity module (USIM) subscription to the UE by a subscription provisioning network, wherein the modified USIM subscription is associated with multiple service provider identifiers, and wherein the modified USIM subscription is for storing in the UE, separate from an unmodified USIM subscription in the UE and is for authentication with discovered networks that advertise an access mode identifier as a public land mobile network (PLMN) identifier;
broadcasting information including a service provider identifier of a service provider associated with a network and the access mode identifier as the PLMN identifier;

receiving, from the UE, a subscriber identifier for authenticating the UE to access the network, wherein the subscriber identifier is generated based at least in part on the service provider identifier associated with the service provider and a modified mobile subscriber identity associated with the service provider, and wherein the service provider identifier is not a PLMN-ID; and authenticating the UE with the network based on a modification of a derivative of extensible authentication protocol (EAP) authentication and key agreement (AKA) (EAP-AKA'), wherein the modification comprises of communicating the subscriber identifier with the service provider for authentication.

22. The method of claim 21, wherein the modified USIM subscription is associated with the multiple service provider identifiers that includes at least one of a domain-based service provider identifier based on a domain name or an operator identifier (OID)-based service provider identifier based on an OID.

23. The method of claim 22, wherein the modified USIM subscription includes at least one modified mobile subscriber identity associated with each of the multiple service provider identifiers.

24. The method of claim 22, wherein a home public land mobile network (HPLMN) ID associated with the modified USIM subscription is set to a specific PLMN-ID indicating that the modified USIM subscription is modified.

25. The method of claim 22, wherein the modified USIM subscription is associated with a USIM application that uses a same Application Identifier as a different USIM application for the unmodified USIM subscription, or uses an Application Identifier different from the different USIM application for the unmodified USIM subscription.

26. The method of claim 22, wherein the modified USIM subscription includes the modified mobile subscriber identity which is one of an international mobile subscriber identity (IMSI), a mobile subscription identification number (MSIN), or a subscriber permanent identifier (SUPI) associated with the modified USIM subscription.

27. An apparatus for wireless communication, comprising:
a transceiver;
a memory; and
at least one processor communicatively coupled with the transceiver and the memory, wherein the at least one processor is configured to:
provision a modified universal subscriber identity module (USIM) subscription to the UE by a subscription provisioning network, wherein the modified USIM subscription is associated with multiple service provider identifiers, and wherein the modified USIM subscription is for storing in the UE, separate from an unmodified USIM subscription in the UE, and is for authentication with discovered networks that advertise an access mode identifier as a public land mobile network (PLMN) identifier;
broadcast information including a service provider identifier of a service provider associated with a network and the access mode identifier as the PLMN identifier;
receive, from a user equipment (UE), a subscriber identifier for authenticating the UE to access the network, wherein the subscriber identifier is generated based at least in part on the service provider identifier associated with the service provider and a modified mobile subscriber identity associated with the service provider, and wherein the service provider identifier is not a public land mobile network (PLMN) identifier (ID); and
authenticate the UE with the network based on a modification of a derivative of extensible authentication protocol (EAP) authentication and key agreement (AKA) (EAP-AKA'), wherein the modification comprises of communicating the subscriber identifier with the service provider for authentication.

28. The apparatus of claim 27, wherein the modified USIM subscription is associated with the multiple service provider identifiers that includes at least one of a domain-based service provider identifier based on a domain name or an operator identifier (OID)-based service provider identifier based on an OID.

* * * * *